Feb. 1, 1966   E. W. WALKER   3,232,090
PIPELINE STATION FOR SELECTIVELY LAUNCHING OR RECEIVING SPHEROIDS
Filed July 11, 1963   2 Sheets-Sheet 1
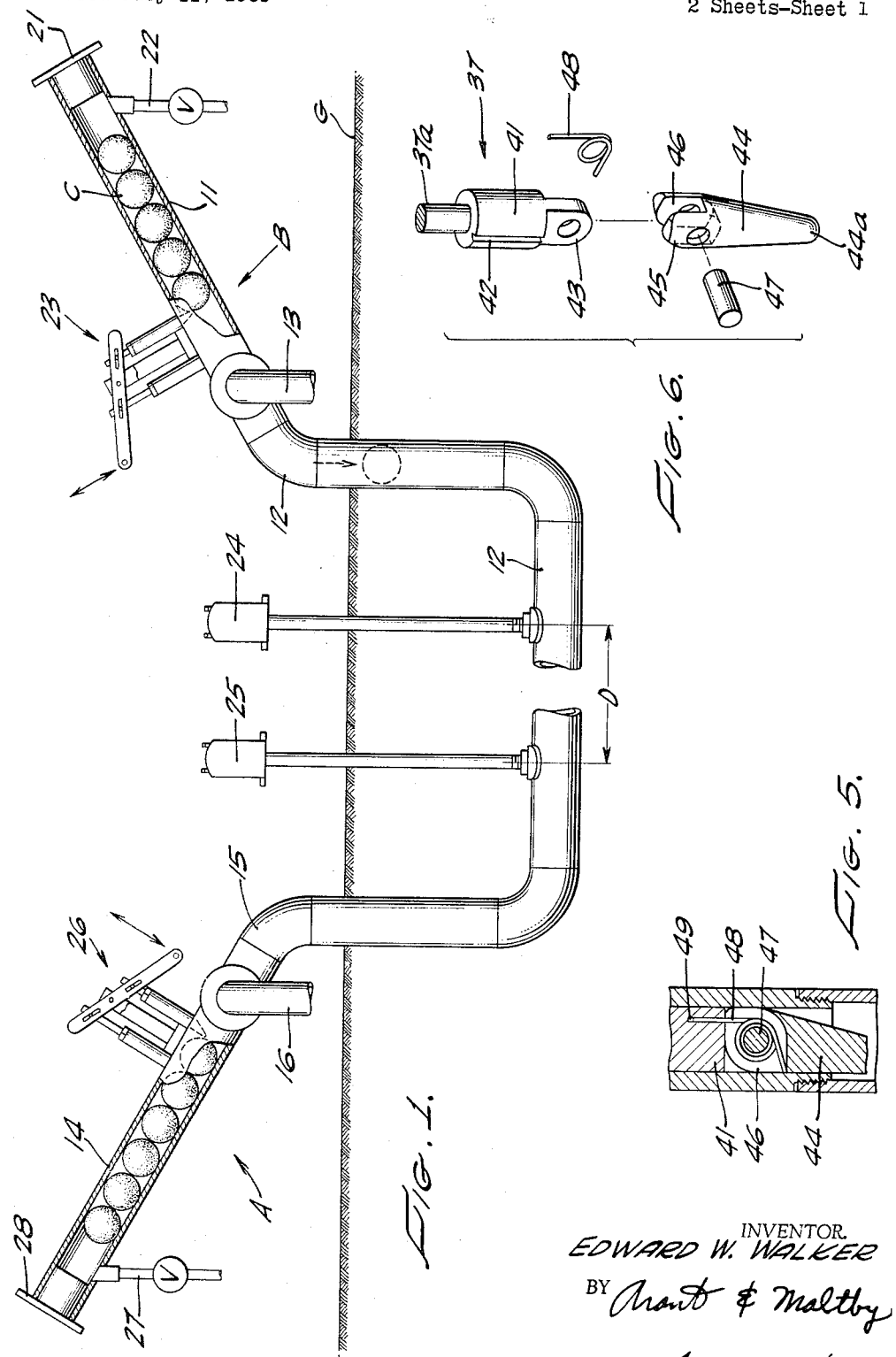
INVENTOR.
EDWARD W. WALKER
BY Grant & Maltby
ATTORNEYS

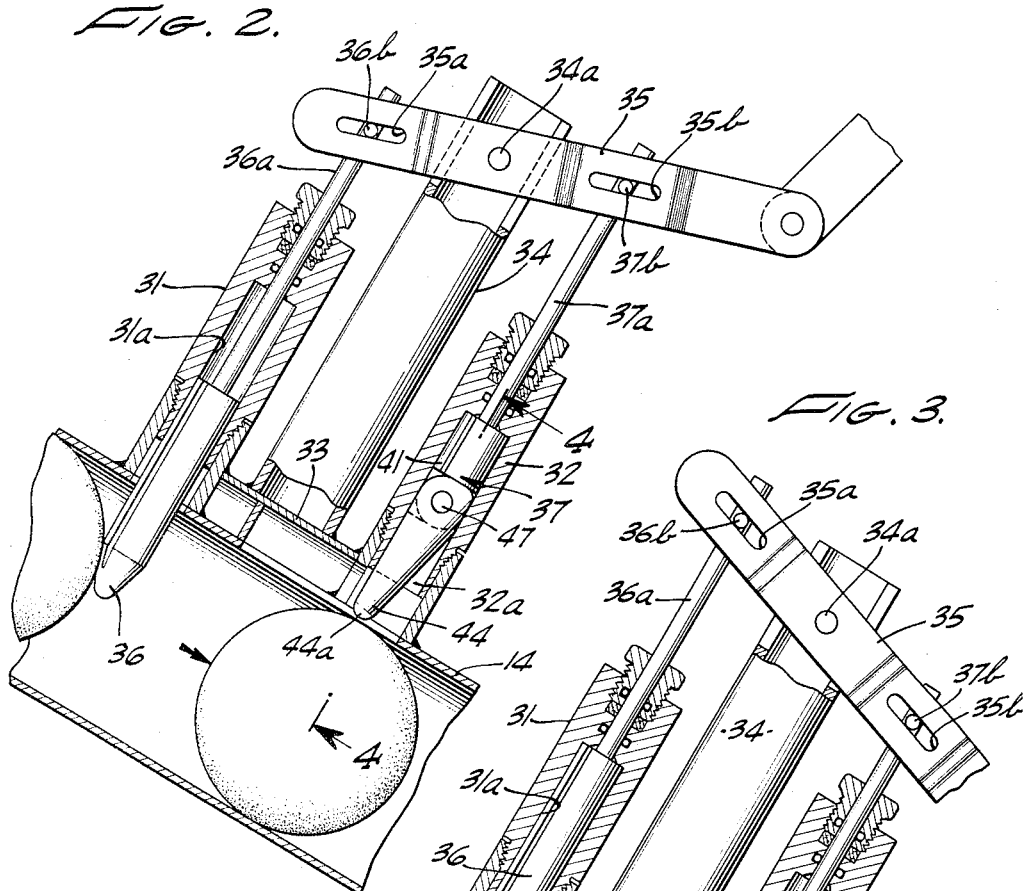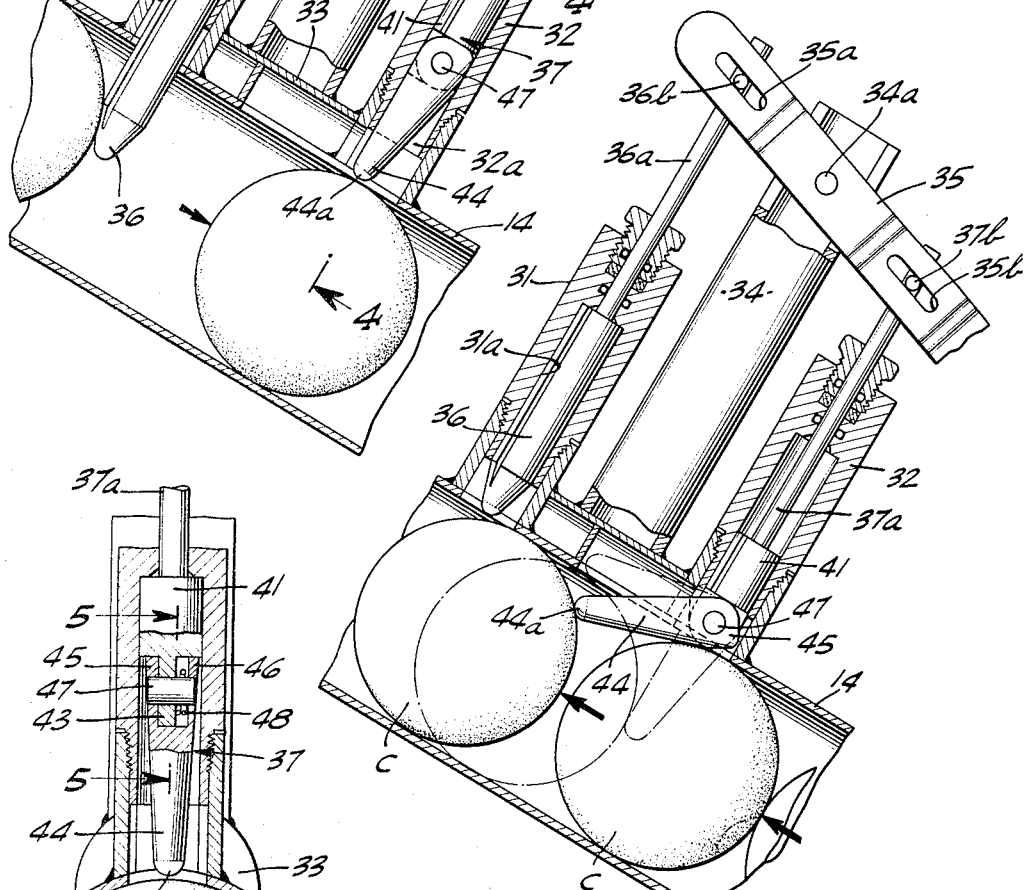

United States Patent Office 3,232,090
Patented Feb. 1, 1966

3,232,090
PIPELINE STATION FOR SELECTIVELY LAUNCH-
ING OR RECEIVING SPHEROIDS
Edward W. Walker, 1634 N. Grand Oaks,
Pasadena, Calif.
Filed July 11, 1963, Ser. No. 294,450
7 Claims. (Cl. 73—3)

The present invention relates to a pipeline station which is adapted to be selectively used either for launching spheroids or similar bodies into an associated pipeline, or for retentively receiving them from the pipeline.

Elastomeric spheroids are now commonly used in oil and gas pipelines, both for batch separation and also for measurement purposes to calibrate or verify the accuracy of flow meters. While the present invention is illustrated herein as applied to the latter purpose, its usefulness is not necessarily thus limited.

A principal object of the invention is to provide a combined launching and receiving station, for pipeline spheroids or similar objects.

Another object of the invention is to provide a novel escapement device which is particularly adapted for use in conjunction with a combined launching and receiving station for pipeline spheroids.

A further object of the invention is to provide a volumetric measuring system in a pipeline, in which the direction of movement of the spheroids within the pipeline is reversible, thus obviating the necessity for physical removal of the spheroids from the pipeline and its associated launching and/or receiving stations.

The objects and advantages of the invention will be more fully understood from the following description considered in conjunction with the accompanying drawings, wherein:

FIGURE 1 is an elevational view, partly in cross-section, of a pipeline volumetric measuring system in accordance with the invention;

FIGURE 2 is a cross-sectional elevational view of the escapement portion of the launching station of FIGURE 1;

FIGURE 3 is a cross-sectional elevational view of the escapement portion of the receiving station of FIGURE 1;

FIGURE 4 is a cross-sectional elevational view taken on the line 4—4 of FIGURE 2;

FIGURE 5 is a cross-sectional elevational view taken on the line 5—5 of FIGURE 4;

FIGURE 6 is an exploded perspective view of the hinged arm portion of the escapement device.

Referring now to FIGURE 1 of the drawings, the letter A designates a spheroid receiving station and the leter B a spheroid launching station. Stations A and B are located a considerable distance apart, and are used for launching a plurality of spheroids C into, or receiving them from, a measured section of pipline D which lies intermediate to the two stations.

A first pipeline section 11 is inclined at an angle of approximately 40 degrees from the horizontal, and constitutes a storage magazine for the spheroid launching station B. The lower end of pipeline section 11 leads directly into the upper end of a pipeline section 12 which in turn communicates with one end of the measured section D that is buried beneath the ground level G. For reasons which are conventional and well known the interior diameter of the magazine pipeline section 11 is made at least several thousandths of an inch greater than the interior diameter of the pipe section 12. Another pipeline section 13 which is of substantially lesser diameter than the pipeline section 12 is coupled at a right angle to the pipeline section 11, just above the lower end thereof. In accordance with this well known arrangement the pipeline sections 12 and 13 constitute successive portions of a continuous oil or gas transmission line, while the magazine 11 accomplishes the storage of spheroids C which are selectively injected into or received from the pipeline section 12, but which because of the smaller diameter of the pipeline section 13 are not able to enter therein.

In a similar manner the pipeline section 14 provides a storage magazine for the receiving station A, and communicates directly with a slightly smaller section 15 which leads to the submerged measuring section D, while a still smaller pipeline section 16 is connected just above the lower extremity of the magazine 14. It will therefore be appreciated that the continuous transmission line includes the pipeline sections 13, 12, D, 15, and 16, but does not normally include either of the storage magazines 11 and 14.

The complete measuring system of FIGURE 1 additionally includes closure devices 21 and 28 which are attached to the upper ends of magazines 11 and 14, respectively. While the angle of inclination of the magazines 11 and 14 is calculated to permit the launching by force of gravity of spheroids C from either of the stations A and B, it is nevertheless true that the use of fluid flow to control the movement of the spheroids into or out of the magazines may be necessary or desirable either in conjunction with the launching or with the receiving of spheroids or both. For that reason the magazines 11 and 14 are also equipped with valved return lines 22 and 27, respectively, coupled to the upper ends thereof. Identical escapement devices 23 and 26 are attached to the magazines 11 and 14, respectively, near the lower ends thereof, and more specifically, just above the connections of the pipeline sections 13 and 16, respectively. Further included in the overall system are detection devices 24 and 25 which are connected to the pipeline at the juncture of sections 12 and D, and D and 15, respectively.

The purpose of the detection devices 24 and 25 is to detect the passage of a spheroid through the pipeline immediately thereunder. These detection devices may, for example, be of the type that is manufactured and sold by Magnetrol, Inc., 5300 Belmont Road, Downers Grove, Illinois, under the trademark Magnetrol or Pig-Trol. Since the pipeline section D lying between the two measuring stations 24 and 25 has both a fixed length and a fixed volume, it will be readily understood that a single spheroid C that is launched from station B will cause an indication first at the measuring station 24 and thereafter at the measuring station 25, and that the separation between these two indications in terms of quantity of fluid flow through the pipeline is a definitely known volume. Accordingly it follows that a flow meter coupled in series with either of the pipeline sections 13 or 16 can be calibrated or monitored in accordance with these indications from the two measuring stations of the calibrating system.

A significant feature of the present invention is that the identical escapment devices 23 and 26 are selectively operable either for releasing spheroids, or for retentively receiving them. The launching and receiving stations A and B may therefore be of identical construction as illustrated, with one station being used for launching and the other for receiving during one period of time, and the relationship being reversed during a succeeding period of time. Regardless of which station is being used for launching, the operation of escapment device 23 permits each successive spheroid C to move downwardly under the influence of gravity, this being possible by virtue of the fact that the spheroids C are of such a diameter as to fit tightly within the main pipeline sections 12, D, and 15, but less tightly within the magazine, and hence oil or other fluid contained in the transmission line flows upwardly in the launching magazine about the spheroids and thus permits them to be released or discharged toward the measuring line section D. Whichever station is used for receiving is powered or energized by the kinetic force of fluid flowing in the main line, which thrusts each successive spheroid upwardly toward the magazine of the receiving station with sufficient force to overcome the intital opposition of the escapment device thereto.

Thus the valved return lines 22 and 27 are not normally utilized either in conjunction with the launching station or the receiving station during the accomplishment of a flow meter calibration or other measurement of the fluid flow through the main pipeline. However, the flow of fluid through a main pipeline is generally in one particular direction, and is not easily or conveniently reversible. The present invention is based on the fact that, while it is not convenient or practical to reverse the flow of fluid in the main line simply for returning measuring spheroids from the receiving station back to the launching station, that it is nonetheless both convenient and practical to shut down the normal operation of the main transmission line for the express purpose of returning the spheroids. When such a shutdown is made the magazine of the station that has formerly been used for receiving is full of spheroids, and the objective is to have it operate as a launching station for returning the spheroids back to whence they came. It then becomes necessary to supply an auxiliary flow of fluid from an auxiliary source, not shown, to the valved return line asociated with the magazine of that particular station. The flow of fluid from the auxiliary source is then permitted to flow through the line sections 15, D and 12, solely for the purpose of returning spheroids from the station A to the station B, prior to the next calibration of flow meters in the main transmission line.

Reference is now made to the remaining figures of the drawing which illustrate the structure and operation of the escapment device. FIGURE 2 illustrates the operation of the escapment in launching spheroids by force of gravity, while FIGURE 3 illustrates the operation of the escapment for receiving spheroids that are thrust upward into the magazine by kinetic energy of the fluid flowing in the main line. FIGURES 4 to 6, inclusive, are detailed views of the hinged arm of the escapment, whose significant operation occurs only during the receiving action.

The escapement device includes a pair of housings 31 and 32 which are disposed perpendicular to the magazine (here identified as 14) and which have a separation along the length of the magazine which is slightly greater than the diameter of one spheroid. An intermediate housing 33 extends parallel with and adjacent to the magazine, the ends of the housing 33 being connected to both of the housings 31 and 32. These three housings are connected to each other and to the magazine by welding or other suitable means.

A chamber 31a formed within the housing 31 receives a first arm or piston 36 having a drive rod 36a rigidly coupled thereto. In the upper position of drive rod 36a the arm or piston 36 is fully contained within the chamber 31a; but in the lower position of drive rod 36a the arm or piston 36 extends a considerable distance transversely inwardly of the magazine 14, such as for example, somewhat over half the diameter of the magazine 14. In similar fashion the housing 32 has an interior chamber 32a which contains a second arm or piston 37 having an asociated drive rod 37a.

A support stub 34 is rigidly fastened to the longitudinal center of the housing 33 and extends upwardly therefrom in parallel relationship with the housing 31 and 32, but projecting thereabove. The upper ends of the housings 31 and 32 are provided with suitable fluid packings or bearings which permit the drive rods 36a and 37a, respectively, to project therethrough in fluid sealing engagement therewith. A pivot pin 34a at the upper end of stub 34 supports a lever arm 35 which is in turn pivotally coupled to the upper ends of both of the drive rods 36a and 37a. More specifically, the upper end of drive rod 36a carries a pivot pin 36b which slidingly reciprocates in a longitudinal slot 35a of the lever arm 35, and the upper end of the drive rod 37a carries a pivot pin 37b which slidingly reciprocates in a longitudinal slot 35b in the lever arm 35.

In the operation of the escapment device, therefore, the reciprocation of the lever arm 35 causes first one and then the other of the arms 36, 37 to be injected into the magazine 14 in the path of travel of the spheroids C. In the launching action as illustrated in FIGURE 2, a plurality of spheroids C are sequently arrayed in the magazine 14 above the arm or piston 36, and the objective is to release them into the main pipeline only one at a time. When arm 36 is interposed in the path of the spheroids none is released, but when it is raised the lowermost spheroid moves down the magazine and comes to occupy a position of rest against the arm 37. When the lever 35 is reciprocated to its opposite position the downward movement of the arm or piston 36 causes it to separate the first and second spheroids from each other. In this connection it will be noted that the lowermost end of the arm 36 is smoothly rounded so that it will provide a separation between two successive spheroids without puncturing or damaging either of them. At the time of lowering the arm 36 into this position the arm 37 is raised completely out of the path of spheroid travel, as illustrated in FIGURE 2, with the result that the lowermost one of the spheroids is then released downward into the main pipeline. It will be recognized that in this respect the operation of the escapement device is rather conventional.

When the station A or B is used as a receiving station, however, the operation of the escapement device is not conventional at all. The arm or piston 37 consists of a rigid part and a hinged movable part, the structure of which are most readily understood from FIGURES 5 and 6. The rigid or fixed portion of the arm 37 includes a cylindrical base 41 having an elongated groove 42 formed therein for keying purposes, to prevent undesired rotation of the arm within the chamber 32a. Extending downwardly from the base 41 is a perforated ear 43, whose plane lies parallel to the longitudinal axis of magazine 14. Hinged arm or projection 44 is rounded on its lower end 44a in the same manner as the lower end of arm 36. The upper end of projection 44 carries a parallel pair of perforated ears 45, 46, which receive a pin 47 for pivotally coupling them to the ear 43. A spring 48 completes the assembly, the upper end of the spring being received in a spring recess 49 formed longitudinally in base 41, while the lower end of the spring engages projection 44 between the ears 45, 46. The shapes of the ears, and the action of the spring, are such as to selectively permit the arm or projection 44 to swing inwardly of the magazine 14, toward the arm 36, but not in the other direction. It will be seen that the housing 33 has a chamber 33a formed therein which is contiguous with the lower end of the chamber 32a, and as best seen in FIGURE 4 the location of the hinge is such that when member 44 is in its lowermost position and hinging action occurs, it is then fully received within the recesses 33a and 32a so as to be completely removed from the path of the spheroids.

In receiving spheroids, the escapement is set in the position shown in FIGURE 3 with arm 36 fully withdrawn and arm 37 fully inserted into the magazine. As the first spheroid arrives, the hinged arm 44 swings to its upward position, then after the spheroid is past returns to its lower position, as indicated in dotted lines in FIGURE 3. The first spheroid C and also each subsequently received spheriod are therefore retained in the magazine.

While reference has been made herein only to spheroids it will be understood that cylindrical or other shaped objects may be used in conjunction with the apparatus of the present invention.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. An escapement device for a pipeline, which is selectively operable either in a first mode for releasing objects one at a time for movement in one direction through the pipeline, or in a second mode for retentively receiving objects moving in the other direction through the pipeline, said escapement device comprising, in combination:
   a pair of arms insertable transversely into the pipeline at longitudinally separated positions therein;
   means for inserting one of said arms while withdrawing the other, and vice versa, to accomplish said first mode of operation;
   one of said arms being adapted to remain inserted in the pipeline during said second mode of operation, and having a hinged end swingable in only one direction lengthwise of the pipeline to permit the passage of an object moving therein;
   and spring means for returning said hinged end to its transverse position.

2. In a fluid transmission pipeline, a volumetric measuring system comprising, in combination:
   a measured section of the pipeline;
   measurement stations coupled to respective ends of said measured section for detecting the passage of a spheroid within the pipeline;
   a pair of spheroid launching and receiving stations coupled to the pipeline outside respective ends of said measured section, each of said launching and receiving stations being selectively operable either in a first mode for releasing a series of spheroids one at a time into the pipeline, or in a second mode for retentively receiving spheroids from the pipeline;
   one of said stations being operable in the first mode while the other is operable in the second mode, and vice versa;
   and valved return line means coupled to both of said launching and receiving stations for supplying fluid to said measured section of the pipeline in a direction reverse to the normal direction of flow, thereby to return spheroids from the station initially acting as the receiving station to the station initially acting as the launching station.

3. A combined launching and receiving station for pipeline spheroids, comprising:
   an elongated storage magazine adapted to store a plurality of sequentially arranged spheroids;
   means for coupling one end of said magazine to a pipeline;
   valve means selectively closing the other end of said magazine, for controlling fluid flow therethrough;
   and an escapement device cooperatively associated with said one end of said magazine, said escapement device being selectively operable either in a first mode for releasing spheroids one at a time from said magazine ino the pipeline, or in a second mode for retentively receiving spheroids from the pipeline;
   said escapement device including a hinged arm insertable transversely into said magazine during said second mode of operation, said hinged arm being swingable inwardly of said magazine in response to the reception of each spheroid but not being swingable outwardly and spring means for returning said hinged arm to its transverse position;
   said magazine being of substantially uniform cross-sectional area throughout its length whereby the flow of fluid therethrough in a predetermined direction propels the spheroids in the same direction.

4. In a fluid transmission pipeline, a volumetric measuring system comprising, in combination:
   a measured section of the pipeline;
   measurement stations coupled to respective ends of said measured section for detecting the passage of a spheroid within the pipeline;
   a pair of spheroid launching and receiving stations coupled to the pipeline outside respective ends of said measured section, each of said launching and receiving stations including an escapement device which is selectively operable either in a first mode for releasing spheroids one at a time into the pipeline, or in a second mode for retentively receiving spheroids from the pipeline, said escapement device including a pair of arms insertable transversely into the pipeline at longitudinally separated positions therein, means for inserting one of said arms while withdrawing the other, and vice versa, to accomplish said first mode of operation, one of said arms being adapted to remain inserted in the pipeline during said second mode of operation, and having a hinged end swingable in only one direction lengthwise of the pipeline to permit the passage of an object moving therein, and spring means for returning said hinged end to its transverse position;
   said escapement of one of said stations being operable in the first mode while the other is operable in the second mode, and vice versa;
   and valved return line means coupled to both of said launching and receiving stations for supplying fluid to said measured section of the pipeline in a direction reverse to the normal direction of flow, thereby to return spheroids from the station initially acting as the receiving station to the station initially acting as the launching station.

5. An escapement device for a pipeline, which is selectively operable either in a first mode for releasing objects one at a time for movement in one direction through the pipeline, or in a second mode for retentively receiving objects moving in the other direction through the pipeline, said escapement device comprising, in combination:
   a pair of arms insertable transversely into the pipeline at longitudinally separated positions therein;
   means for inserting one of said arms while withdrawing the other, and vice versa, to accomplish said first mode of operation;
   one of said arms being adapted to remain inserted in the pipeline during said second mode of operation, and having a hinged end swingable in only one direction lengthwise of the pipeline to permit the passage of an object moving therein;
   and means for returning said hinged end to its transverse position.

6. In a fluid transmission pipeline, a volumetric measuring system comprising, in combination:
   a measured section of the pipeline;
   measurement stations coupled to respective ends of said measured section for detecting the passage of a spheroid within the pipeline;
   a pair of spheroid launching and receiving stations coupled to the pipeline outside respective ends of said measured section, each of said launching and receiving stations including an escapement device which is selectively operable either in a first mode for releasing a series of spheroids one at a time into the pipeline, or in a second mode for retentively receiving a series of spheroids from the pipeline;
   the escapement device of one of said stations being operable in the first mode while the other is operable in the second mode, and vice versa;
   and valved return line means coupled to both of said launching and receiving stations for supplying fluid to said measured section of the pipeline in a direction reverse to the normal direction of flow, thereby to return spheroids from the station initially acting as the receiving station to the station initially acting as the launching station.

7. A combined launching and receiving station for pipeline spheroids, comprising:
   an elongated storage magazine adapted to store a plurality of sequentially arranged spheroids;
   means for coupling one end of said magazine to a pipeline;
   valve means selectively closing the other end of said magazine, for controlling fluid flow therethrough;
   and an escapement device cooperatively associated with said one end of said magazine, said escapement device being selectively operable either in a first mode for releasing spheroids one at a time from said magazine into the pipeline, or in a second mode for retentively receiving spheroids from the pipeline, said escapement device including a hinged arm insertable transversely into said magazine during said second mode of operation;
   said magazine being of substantially uniform cross-sectional area throughout its length whereby the flow of fluid therethrough in a predeterminred direction propels the spheroids in the same direction.

References Cited by the Examiner
UNITED STATES PATENTS

| | | | |
|---|---|---|---|
| 2,772,561 | 12/1956 | Plank et al. | 73—3 |
| 2,965,125 | 12/1960 | Osborne et al. | 137—268 |
| 3,021,703 | 2/1962 | Pfrehm | 73—3 |

LOUIS R. PRINCE, *Primary Examiner.*

S. CLEMENT SWISHER, *Assistant Examiner.*